United States Patent
Young

(10) Patent No.: US 12,351,340 B2
(45) Date of Patent: Jul. 8, 2025

(54) AERIAL POWER SUPPLY SYSTEM FOR A TETHERED UNMANNED AERIAL VEHICLE

(71) Applicant: DRONE EVOLUTION LTD, Caerphilly West Glamorgan (GB)

(72) Inventor: John Young, Caerphilly West Glamorgan (GB)

(73) Assignee: DRONE EVOLUTION LTD, Caerphilly West Glamorgan (GB)

( * ) Notice: Subject to any disclaimer, the term of this patent is extended or adjusted under 35 U.S.C. 154(b) by 112 days.

(21) Appl. No.: 17/633,571

(22) PCT Filed: Aug. 4, 2020

(86) PCT No.: PCT/GB2020/051863
§ 371 (c)(1),
(2) Date: Feb. 7, 2022

(87) PCT Pub. No.: WO2021/023986
PCT Pub. Date: Feb. 11, 2021

(65) Prior Publication Data
US 2022/0363410 A1 Nov. 17, 2022

(30) Foreign Application Priority Data
Aug. 5, 2019 (GB) ...................................... 1911177

(51) Int. Cl.
*B64F 3/02* (2006.01)
*B64U 10/60* (2023.01)
(Continued)

(52) U.S. Cl.
CPC ................ *B64F 3/02* (2013.01); *B64U 10/60* (2023.01); *B64U 20/90* (2023.01); *B64U 50/34* (2023.01)

(58) Field of Classification Search
CPC .................................. B64F 3/02; B64U 50/34
See application file for complete search history.

(56) References Cited

U.S. PATENT DOCUMENTS

| 2016/0185456 A1* | 6/2016 | Ducharme | ........ H02M 3/33523 |
| | | | 244/39 |
| 2017/0144754 A1* | 5/2017 | Limvorapun | ........... B60L 53/54 |

(Continued)

FOREIGN PATENT DOCUMENTS

| CN | 108268079 A | 7/2018 |
| WO | WO2018156991 A1 | 8/2018 |
| WO | WO2018183178 A1 | 10/2018 |

OTHER PUBLICATIONS

International Search Report (ISR) relating to International Application No. PCT/JP2020/051863, dated Nov. 17, 2020.

(Continued)

*Primary Examiner* — Timothy D Collins
*Assistant Examiner* — Justin Michael Heston

(57) ABSTRACT

An electrical power supply system for a tethered small unmanned aerial vehicle has a ground station (1) connected to a universal aerial power supply (13) by a tether (10). The universal aerial power supply is capable of installation into the battery dock of a conventional free flying small unmanned aerial vehicle to deliver power to the small unmanned aerial vehicle systems during flight. The universal aerial power supply is compatible with a range of different small unmanned aerial vehicles and a range of classes of small unmanned aerial vehicles.

18 Claims, 4 Drawing Sheets

(51) Int. Cl.
   *B64U 20/90*   (2023.01)
   *B64U 50/34*   (2023.01)

(56) References Cited

U.S. PATENT DOCUMENTS

| | | | |
|---|---|---|---|
| 2018/0050798 A1* | 2/2018 | Kapuria | ................... B64F 3/02 |
| 2018/0118374 A1 | 3/2018 | Lombardini et al. | |
| 2019/0283869 A1* | 9/2019 | Broberg | ................ B64C 39/024 |

OTHER PUBLICATIONS

Written Opinion of the ISA relating to International Application No. PCT/JP2020/051863, dated Nov. 17, 2020.

\* cited by examiner

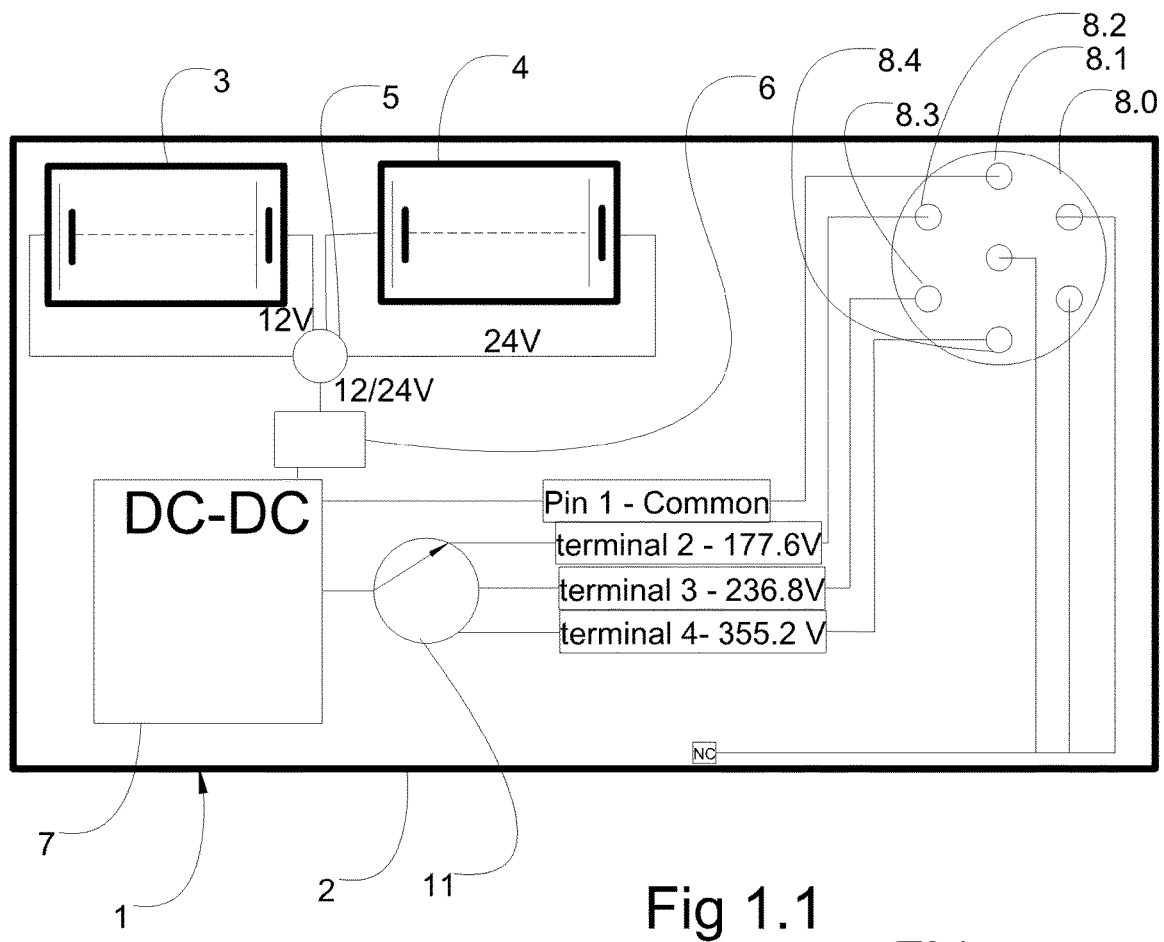
Fig 1.1
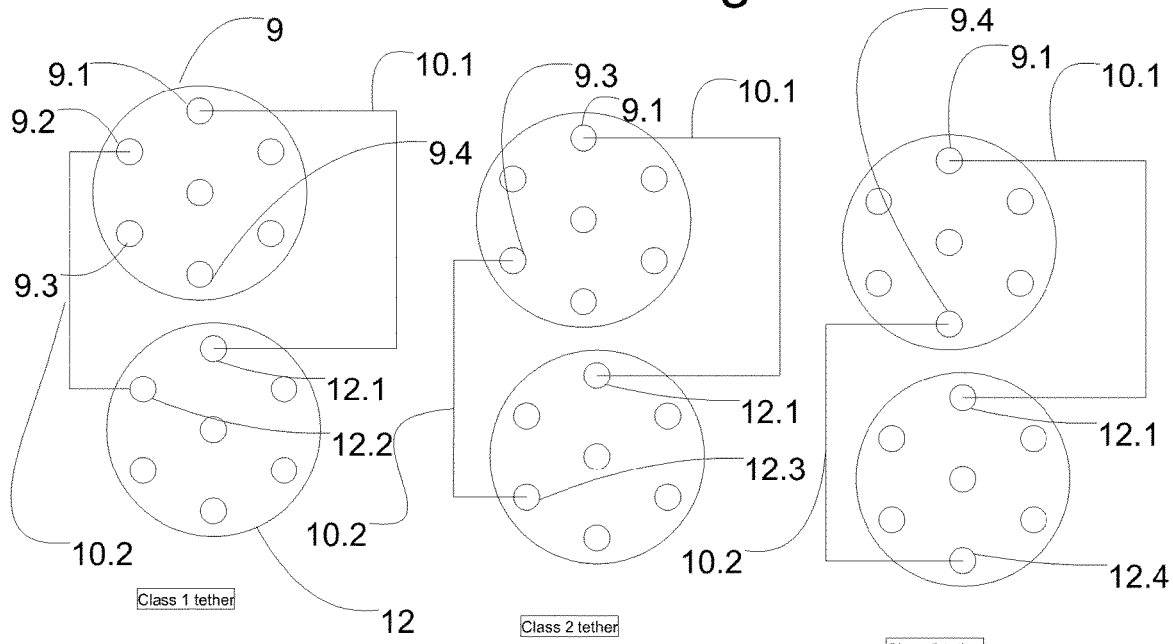
Fig 1.2  Fig 1.3  Fig 1.4

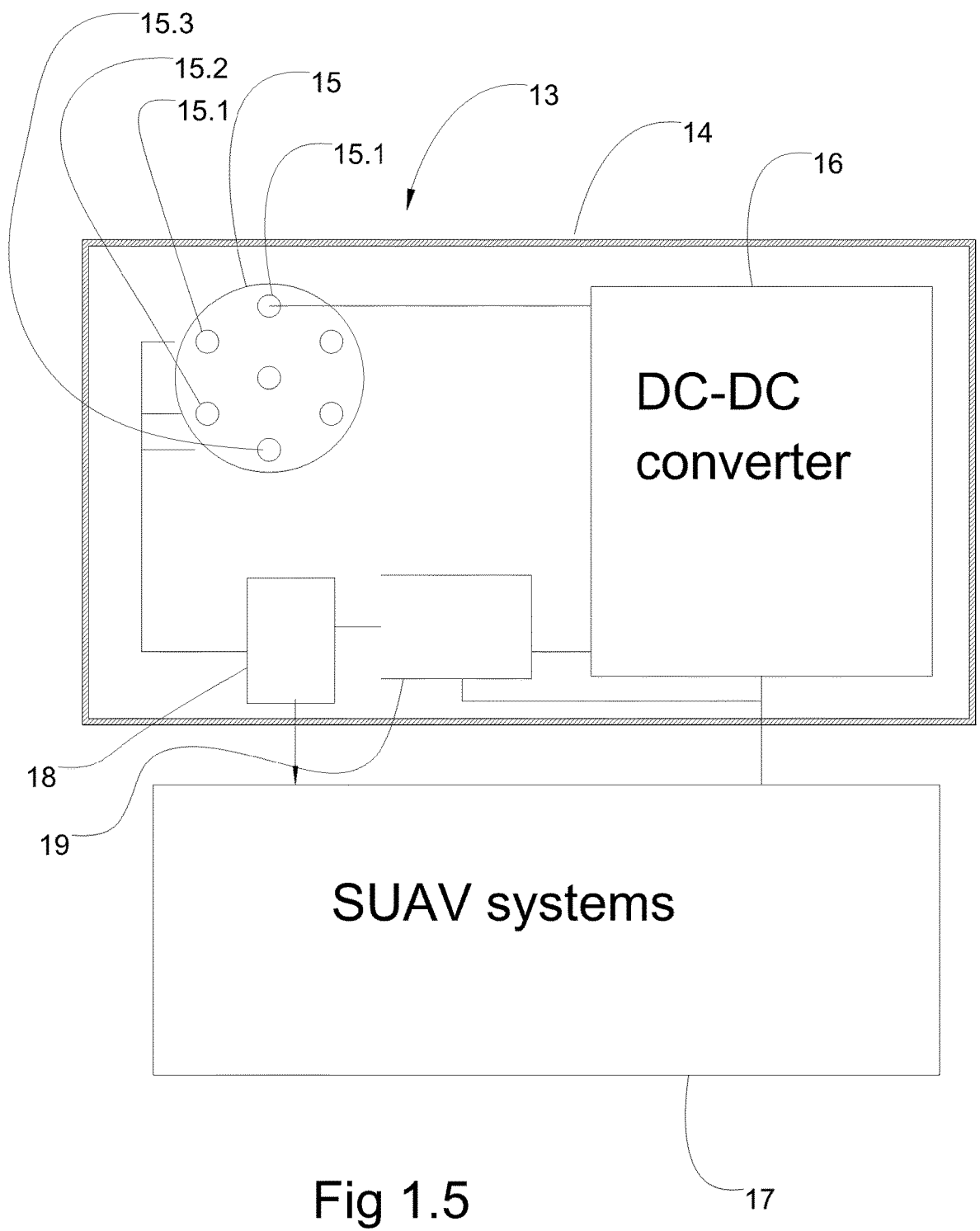
Fig 1.5

AERIAL POWER SUPPLY SYSTEM FOR A TETHERED UNMANNED AERIAL VEHICLE

CROSS REFERENCE TO PRIOR APPLICATION(S)

This application is a U.S. National Stage Patent Application of PCT International Patent Application Ser. No. PCT/GB2020/051863 (filed on Aug. 4, 2020) under 35 U.S.C. § 371, which claims priority to United Kingdom application Ser. No. 1911177.2 (filed on Aug. 5, 2019) under 35 U.S.C. § 119 (a), all of which are hereby incorporated by reference herein in their entireties.

TECHNICAL FIELD

The present invention relates to the supply of power to a unmanned aerial vehicle.

Unmanned aerial vehicles are powered by power packs containing a battery of chemical storage cells. The storage cells are most commonly of Lithium Polymer LiPo chemistry. They come in a range of sizes from a few tens of grams to several kilograms in mass. However, conventional battery powered unmanned aerial vehicles have limited flight duration due to the limited charge storage capacity of the power pack. Where commercial or military usage of an unmanned aerial vehicle is concerned this limits their usefulness.

Tethered unmanned aerial vehicles are also known as a solution to the flight duration problem discussed above. A tethered unmanned aerial vehicle draws power from a ground station resting directly or indirectly on the ground. The ground station is connected to the unmanned aerial vehicle via a long, flexible, electrically conductive tether. Thus a much larger power pack with corresponding energy capacity can be deployed without subjecting the unmanned aerial vehicle to the weight penalty of lifting the large power pack. A disadvantage of this arrangement is that the power pack and tether need to be tailored to the specific unmanned aerial vehicle in order to deliver current at the specific unmanned aerial vehicle demand voltage. Where an operator wishes to be able to deploy any of a range of different unmanned aerial vehicle's especially at short notice, this causes a proliferation of equipment and a consequent burden of expense and maintenance. In some cases an operator may wish to deploy a specific design of unmanned aerial vehicle which is only configured as an onboard battery powered unmanned aerial vehicle.

BACKGROUND ART

US20180118374 discloses an unmanned aerial vehicle having a ground station including a case, a power supply housed in the case, and a tether having a first end and a second end opposite to the first end. The first end of the tether is coupled to the case. The unmanned aerial vehicle system also includes a module including smart battery authentication circuitry configured to be coupled to the second end of the tether. The module is configured to be connected to a unmanned aerial vehicle. The smart battery authentication circuitry enables the unmanned aerial vehicle to receive power from the power supply housed in the case when the module is connected to the unmanned aerial vehicle.

SUMMARY OF INVENTION

According to the present invention there is provided an electrical power supply system for an unmanned aerial vehicle comprising:
a ground station including an electrical power supply to deliver power to a tether;
a connector to electrically connect a ground end of the tether to the ground station;
an aerial power supply to mechanically and electrically connect to an unmanned aerial vehicle power dock, wherein the aerial power supply has a connector to enable an airborne end of the tether to be separably connected to the aerial power supply and the ground station has a connector to enable the ground end of the tether to be separably connected, wherein the aerial power supply includes a unmanned aerial vehicle DC-DC converter;
said ground station adapted to deliver a selected one of a range of discrete voltages to the connected tether whereby the voltage delivered by the aerial power supply to the unmanned aerial vehicle is determined by the voltage applied to the tether so that the aerial power supply can deliver the power demand to any of a range of unmanned aerial vehicles having differing power requirements.

The ground station is adapted to apply direct current to the tether at a required elevated voltage and correspondingly reduced current, thereby reducing power losses and heating of the tether. The aerial power supply reduces the tether voltage to the demand voltage for the particular class of unmanned aerial vehicle. The aerial power supply reduces the tether voltage at a fixed ratio. The voltage delivered to the unmanned aerial vehicle systems from the aerial power supply is therefore determined by the tether voltage and therefore the voltage applied to the tether by the ground station. By virtue of the connector's the power supply system allows the operator to select a tether and aerial power supply appropriate to the particular unmanned aerial vehicle it is required to power. Furthermore the tether of an unmanned aerial vehicle should only be used once before factory refurbishment. This system facilitates factory refurbishment of the tether without the ground station or aerial power supply.

The system of the invention is designed to serve several classes of unmanned aerial vehicle by having a power output at the ground station connector corresponding to the demand of one of each class of unmanned aerial vehicle with an aerial power supply which is largely the same for each unmanned aerial vehicle. Variations between power supplies are entirely expressed in the case whereby the power supply is adapted to connect to the power/battery dock of an unmanned aerial vehicle and a smart connector to interface with the onboard control system of the unmanned aerial vehicle.

Unmanned aerial vehicle classes for this purpose are determined by payload and associated power requirement. In a preferred example:
a. class 1 includes unmanned aerial vehicle with a payload of less than 1 kg, a power demand of 600 W which may use a class 1 tether of 24 AWG operating at a nominal voltage of 177.6 V;
b. class 2 includes unmanned aerial vehicle with a payload between 1 kg and less than 3 kg, a power demand of 1200 W using a class 2 tether of 20 AWG operating at a voltage of 236.8V; and
c. class 3 unmanned aerial vehicle having payloads exceeding 3 kg, power demand up to 2000 W using a tether of 16 AWG operating at a voltage of 355.2V.

Preferably each of the ground station, aerial power supply and each class of tether use a common electrical connector.

Preferably the common electrical connector will have one more pin than the number of classes of tether and unmanned aerial vehicle to be served by the power supply system. So if the system is to serve three classes of unmanned aerial vehicle, the connector has four pins and sockets. Conveniently a common pin serves as a common, earth or negative terminal, a first pin in each of the ground station part of the connector and the aerial power supply part of the connector will serve to deliver and receive power for class 1, a second pin in each of the ground station part of the connector and the aerial power supply part of the connector will serve to deliver and receive power for class 2 and a third pin in each of the ground station part of the connector and the aerial power supply part of the connector will serve to deliver and receive power for class 3. By corresponding connection of the conductors of the tether to each tether part of the connector correct voltage and power is automatically selected for the selected class of tether. In more detail the tether part of the connector will have pin receiving sockets to couple in number and position to connect with each corresponding pin of the ground station part of the connector and the aerial power supply part of the connector. One socket of the tether part is always connected to the common conductor of all tethers. The live conductor of the tether will connect to the connector part socket corresponding to the voltage for that class of tether and to no other. Although the arrangement of the connector parts has been described with pins forming part of the ground station part of the connector and aerial power supply and sockets forming part of the tether power supply connector parts, it should be understood that these arrangements may be wholly or partially reversed, for example to ensure that a ground station end of the tether is only connectable to the ground station and the unmanned aerial vehicle end is only connectable to the aerial power supply. Further, while pins and sockets form the elements of one preferred form of connector, other electrical connector elements may be substituted, for example brushes.

The user thus selects a tether appropriate to the unmanned aerial vehicle, eg class 1 and plugs into the ground station connector. The user may then manually select the correct supply voltage at the ground station by means of a selector switch. The tether is plugged into the aerial power supply installed in the unmanned aerial vehicle. The voltage supply at the unmanned aerial vehicle is determined by the voltage on the tether and therefore the voltage selected at the ground station.

The aerial power supply will include a tether connector in electrical communication with a DC to DC converter. The DC to DC converter will step the tether voltage down from the tether voltage to the demand voltage for the unmanned aerial vehicle. This is generally 11.1V for class 1, 14.8V for class 2 and 22.2V for class 3.

The aerial power supply will include a case part, sized and shaped to be compatible with a battery compartment of a specific unmanned aerial vehicle. The case may have battery case retention means adapted to engage with the battery compartment retention means of the specific unmanned aerial vehicle. Similarly the case part presents at least electrical terminals arranged to connect to the circuitry of the unmanned aerial vehicle. Commonly the tether of the unmanned aerial vehicle will provide a communications channel in addition to the power conductors. Such communication channel may be via an electrical conductor, which may be shielded, or by optical fibre.

The case part may be interchangeable with other aerial power supply components. The aerial power supply may include a backup battery to power the unmanned aerial vehicle in the event the tether or ground station fails and allow the unmanned aerial vehicle to land automatically and safely. The aerial power supply may also include an adaptor interface to emulate a proprietary "smart" unmanned aerial vehicle battery pack. Such proprietary smart battery packs can report the condition eg the charge state of the battery pack to unmanned aerial vehicle control systems and if no good report of the battery pack condition is received the unmanned aerial vehicle control system will prevent operation of the unmanned aerial vehicle. Accordingly the adaptor interface acts to report to the unmanned aerial vehicle control system such that the control system will enable operation of the unmanned aerial vehicle.

The aerial power supply may have a cooling assembly. The aerial power supply cooling assembly may include a cooling fan, or a heat pipe, or a heat sink.

The ground station may comprise separable connectable modules comprising: a rectifier module to transform an alternating current supply to a direct current supply for application to the tether;
  an inverter module separably connectable to the rectifier module, whereby direct current from a direct current source can be converted to an alternating current compatible with the rectifier module; and,
  a battery module comprising a battery of charge storage devices separably connectable to the inverter module.

The rectifier module may be adapted to accept AC from a grid distribution system, usually at 110V or 240V and a frequency of nominally 50 Hz. The rectifier module may output a selected one of a plurality of voltages determined by a class of tether upon connection of the class of tether to an electrical connector on the ground station. Selection of the class of tether is determined by a corresponding class of unmanned aerial vehicle to be powered by the tether as discussed in relation to the first aspect of the present invention.

Third Aspect

The aerial power supply may comprise a aerial power supply connector part of an electrical connector to connect to a corresponding tether connector part, said small unmanned aerial vehicle connector part delivering current in parallel to two or more DC-DC converter modules in order to distribute heat generation and thereby relatively reduce the operating temperature of the aerial power supply.

The highest temperature of the aerial power supply occurs at the DC-DC converter where the high tether voltage is converted to the operating voltage of the unmanned aerial vehicle. By distributing the current conversion over two or more DC-DC converters the invention reduces the maximum temperature of each DC-DC converter relative to a single DC_DC converter serving the same duty.

BRIEF DESCRIPTION OF THE DRAWINGS

Embodiments of a power supply system for a unmanned aerial vehicle constructed in accordance with the present invention will now be described, by way of example only, with reference to the accompanying figures, wherein:
  FIG. 1.1 is a diagram of a ground station connector of a first embodiment;
  FIG. 1.2 is a diagram of wiring for a class 1 tether of the first embodiment;
  FIG. 1.3 is a diagram of wiring for a class 2 tether of the first embodiment;
  FIG. 1.4 is a diagram of wiring for a class 3 tether of the first embodiment;

FIG. 1.5 is a diagram of wiring for a aerial power supply of the first embodiment;

DETAILED DESCRIPTION OF DRAWINGS

Figure 2:
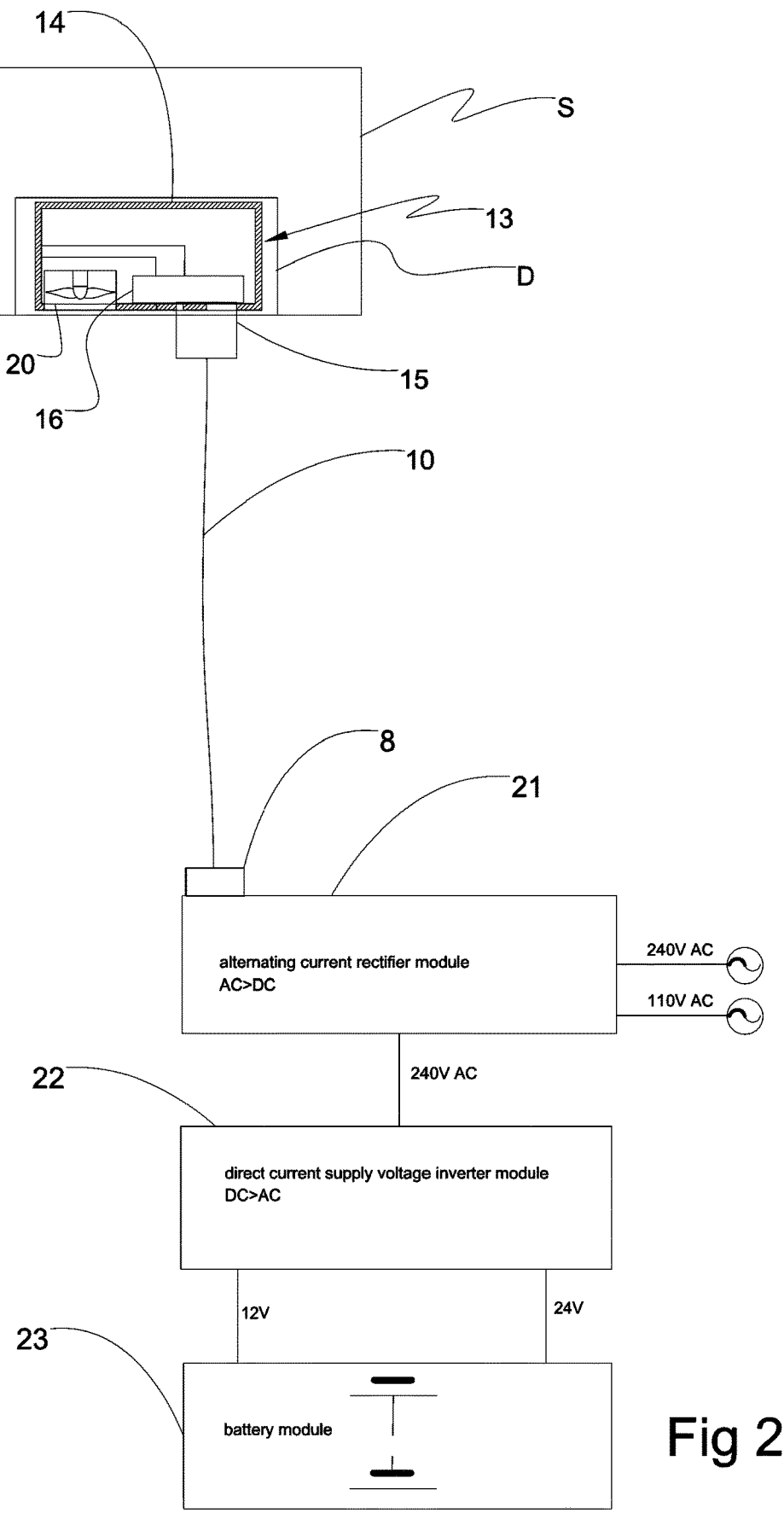
FIG. 2 is a diagram of the system of a second embodiment.
Figure 3:
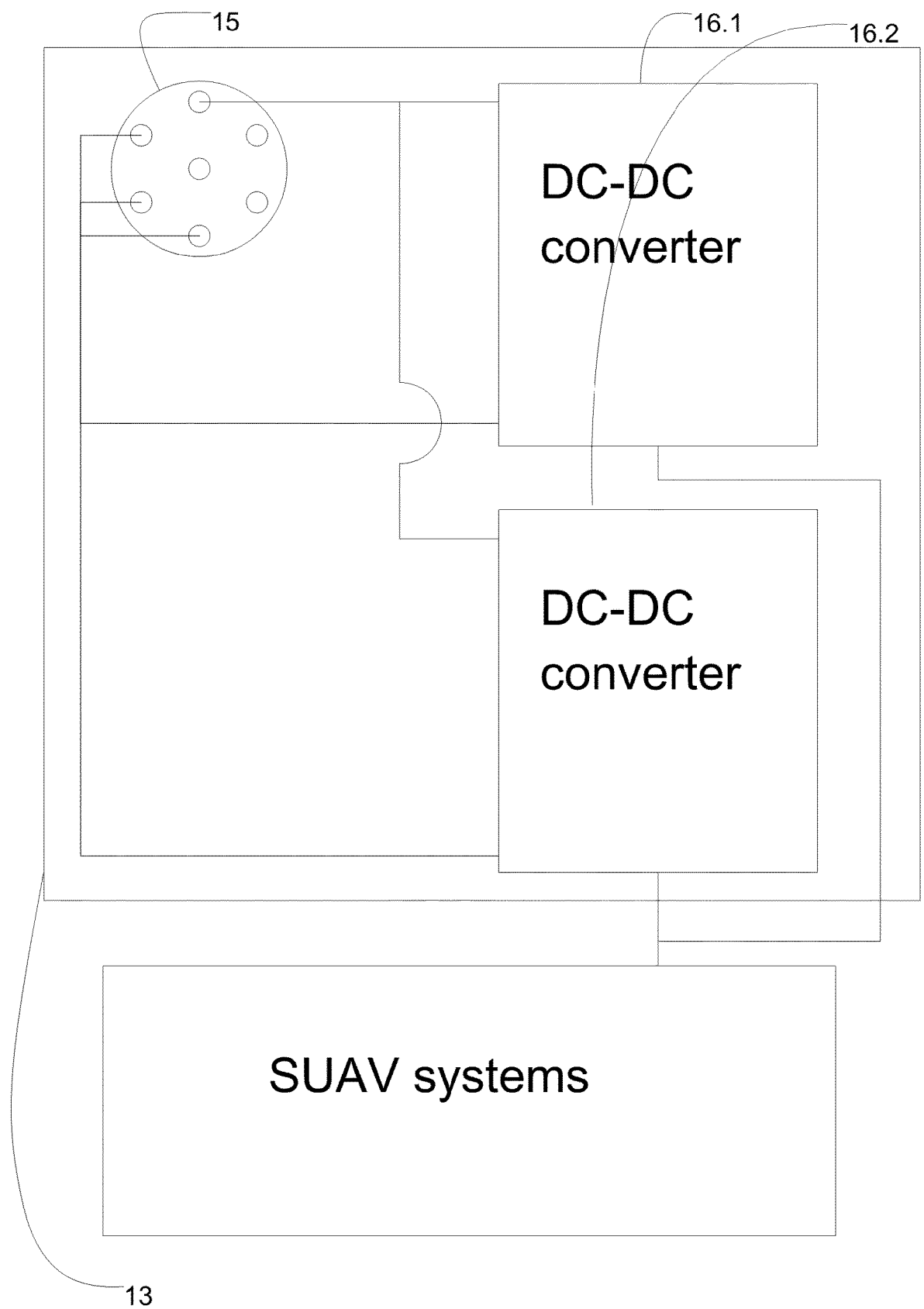
FIG. 3 is a diagram of a third embodiment.

FIG. 1 is a diagram of a first embodiment of a system having a ground station indicated by arrow 1 provided in a case 2. The housing provides a weather proof enclosure for the ground station components which include a battery of rechargeable chemical cells 3, 4 capable of delivering 12V or 24V according to the setting of a switch 5. It may be noted that in variants of the embodiment the 12V or 24V supply may be external, via an electrical connector, and provided, for example, by a vehicle low voltage circuit so the small unmanned aerial vehicle can be powered by the vehicle. Where an internal battery is provided the battery is preferably of rechargeable chemistry and capable of charging via a conventional charging circuit from grid power using technology well known in the art.

The battery applies a voltage to a DC to DC converter via a voltage adjustment circuit 6 which may adjust the voltage by conventional resistive circuitry to output any one of 11.1V, 14.8V or 22.2V. Switch may be manually operable or responsive to other system components as described below. The selected voltage is applied to a DC-DC converter 7, for example, selected from one of the DCM family of DC to DC convertors offered by Vicor®. The converter serves to increase circuit voltage applied to a selected pin 8.2 of a connector 8.0 from nominally 11.1V to 177.6V. A suitable connector 8.0 may be provided by the Jaeger 3 Way Cable Mount MIL Spec Circular Connector Plug, Socket Contacts, MIL-DTL-5015. As illustrated this has seven pins (seven way) or sockets 8.1-8.7 and a housing configured to connect in only one orientation. In the specific example only four pins are used so in practice a four way connector would serve. Ground station connector part 8.0 will be described as having pins 8.1-8.7 for cooperation with a corresponding tether connector part 9.0 attached to a tether 10 having at least two current carrying conductors 10.1 and 10.2. Pin 8.1 is always connected to the common, negative or earth. Pin 8.2 is wired to terminal 2 of a three way switch 11, such that in the condition illustrated 177.6 V is applied to pin 8.2. Pin 8.3 is wired to terminal 3 so that when circuit 7 is switched to deliver 14.8 V to the DC-DC converter 236.8V is applied to pin 8.3. Pin 8.4 is wired to terminal 4 of switch 11 so that when circuit 7 is switched to deliver 22.5V to the DC-DC converter 355.2V is applied to pin 8.4. Whichever pin is live the other pins are open circuit.

FIGS. 1.2-1.4 illustrate wiring for three classes of tether. Each tether has two conductors which are designated common 10.1 and live 10.2. A ground station connector part 9 and aerial power supply connector part 12 are connected to the conductors as follows:

| Tether class | conductor | ground station connector pin | unmanned aerial vehicle connector pin |
|---|---|---|---|
| 1 | 10.1 | 9.1 | 12.1 |
|   | 10.2 | 9.2 | 12.2 |
| 2 | 10.1 | 9.1 | 12.1 |
|   | 10.2 | 9.3 | 12.3 |
| 3 | 10.1 | 9.1 | 12.1 |
|   | 10.2 | 9.4 | 12.4 |

Thus it is not possible to mismatch tether classes and supply voltage, because if switch 11 is incorrectly set no voltage will be applied to the conductor 10.2.

Conveniently the voltage circuit 6 may be driven in response to the position of switch 11.

The system provides a aerial power supply 13. aerial power supply 13 has a case 14 adapted to cooperate with a power supply dock "D" provided in the small unmanned aerial vehicle. Cooperate should be understood to mean that the case includes electrical terminals located to communicate with the electrical terminals in the dock D and that the aerial power supply case is shaped and sized to be secured closely into the dock D using whatever mechanical securing devices are compatible with dock D. The case 14 will present a aerial power supply connector part 15 compatible with the tether connector part 12 whereby the tether can be mechanically and electrically connected. Connector 15 has a first pin 15.1 wired to communicates with the pin 12.1 and with a common terminal on a aerial power supply DC-DC converter 16 which is mounted into the case 14. Pins 15.2, 15.3 and 15.4 are each in electrical communication with a live terminal of the DC-DC converter. Thus the voltage applied to the DC to DC converter is determined by the tether and ground station. The output voltage from the DC to DC converter in the example will be one sixteenth of the applied voltage, ie for a class 1 tether, 11.1V, for class 2 tether, 14.8V and for class 3 22.5V. It will be appreciated that these are nominal voltages and in practice these can vary within tolerance limits according to the conditions of operation of the unmanned aerial vehicle, such as temperature and other factors.

With the voltages at the aerial power supply DC to DC converter stepped down to unmanned aerial vehicle compatible voltages the voltage is applied to the unmanned aerial vehicle systems.

Some unmanned aerial vehicles require a smart battery power pack. This commonly incorporates circuitry to determine the condition of the battery pack in terms of factors such as charge state, temperature, voltage output etc. This is then applied to the unmanned aerial vehicle control system which will respond by enabling or disabling the unmanned aerial vehicle for service. The aerial power supply includes a smart service emulator 18 which imitates the signals which would otherwise be delivered from a smart battery pack in order to enable the unmanned aerial vehicle for service.

The aerial power supply also includes a backup battery 19 which is charged from the DC-DC converter. In the event the tether supply fails the backup battery 19 can provide sufficient power to enable the unmanned aerial vehicle to land safely.

Although only illustrated in FIG. 2 the aerial power supply may also include a cooling system 20 in this case shown as a cooling fan arranged to circulate air through the aerial power supply casing and thereby cool the aerial power supply components. In variants of the embodiments the cooling system may be provided by heat pipes and or heat sinks alone or combination with a cooling fan. This is more important for tethered unmanned aerial vehicle's because they are capable of and likely to be used for prolonged periods of hovering/motionless flight so that the cooling effect of movement through air is attenuated relative to an untethered small unmanned aerial vehicle.

FIG. 2 illustrates a second embodiment of the system wherein the ground station is configured to be modular. The ground station has an AC power module 21 with an enclosure presenting a connector 8 similar to the connector 8 of the first embodiment, and connected to a contained circuit 6 and switch 11. However, circuit 6 draws power from an AC rectifier in the enclosure which in turn draws power from an AC source. In order to draw power the enclosure may include conventional electrical AC power connectors, preferably all-weather connectors. The AC grid source can be either of a 240V or 110 V AC source. In either case the current is rectified to 400V DC before being stepped down in circuit 6 to the standard tether voltages described previously. The aerial power supply is the same as the previously described aerial power supply.

This allows the unmanned aerial vehicle to be powered from a distributed power grid or from a free standing generator.

An inverter module 22 is provided in a case to deliver AC power at 110V or 240V from a DC source at 12V or 24V. The inverter module includes a DC connector to facilitate connection to a DC power source such as a 12V, 24V or 48 V battery or a vehicle low voltage system.

A free standing battery pack 23 is provided capable of being plugged into the inverter module 22 and when the inverter module is plugged into the AC module 21 in order to deliver power from a low voltage, ie 12V or 24V battery to power the unmanned aerial vehicle.

The third embodiment differs from the first and second embodiment in that the aerial power supply includes two or more DC-DC converters 16.1, 16.2 connected to the connector part 15 in parallel. This helps to reduce the current flowing through either of the two converters and thereby distribute the heat generated and keep temperature down. The other components of the system are essentially the same as aerial power supply 13 in the first and second embodiments with wiring changes as will be evident to the person skilled in the art.

The invention claimed is:

1. An electrical power supply system for an unmanned aerial vehicle, operable in at least three classes of unmanned aerial vehicles (UAV) wherein each of the at least three classes is defined by the UAV payload and corresponding power requirement class one having a payload of less than 1 kg, class two having a payload between 1 kg and 3 kg, and class three having a payload exceeding 3 kg, comprising: a ground station including an electrical power supply to deliver power to a tether; a ground tether connector to electrically connect a ground end of the tether to the ground station and having an aerial power supply to mechanically and electrically connect to an unmanned aerial vehicle power dock, wherein the aerial power supply has a connector to enable an airborne connector end of the tether to be separably connected to the aerial power supply and the ground station has a connector to enable the ground tether connector to be separably connected, wherein the aerial power supply includes an unmanned aerial vehicle direct current to direct current (DC-DC) converter; said ground station adapted to deliver a selected one of a range of discrete voltages to the connected tether whereby the voltage delivered by the aerial power supply to the unmanned aerial vehicle is determined by the voltage applied to the tether so that the aerial power supply can deliver the power demand to any of a range of unmanned aerial vehicles having differing power requirements; each tether being wired with a similar multi pin connector for connection to corresponding connector parts at each of the ground station and the aerial power supply; a plurality of different classes of interchangeable tether or tethers are provided, each class of tether being distinguished by a power carrying capacity corresponding to an unmanned aerial vehicle class requirement; each tether having not more than two power conductors comprising a common conductor and a live conductor to conduct power to the unmanned aerial vehicle, each class of tether corresponding to the class of unmanned aerial vehicle defined by the voltage required to power the unmanned aerial vehicle; the ground tether connector for each class of tether having a similar configuration of pins to engage with the single ground station connector, each ground tether connector for said system having; a power conductor wired to a common pin; each tether for a specific class of unmanned aerial vehicle having a single live conductor wired to a class specific pin exclusive to the class; ground station comprises a DC-DC converter that operatively converts a low voltage DC input to one of several discrete higher voltage DC outputs, each converter corresponding to one or more class of unmanned aerial vehicle; each high output voltage of the ground station DC-DC converter being applied to one respective pin of the ground station connector; whereby power can only be delivered to the tether and aerial power supply when the ground station output voltage selected is compatible with the class of tether connected to the ground station and to the tether aerial connector.

2. The system according to claim 1 wherein one of the several discrete DC high output voltages is selected in response to operation of the switch.

3. The system according to claim 2 wherein the discrete voltages are predetermined voltages including 11.1V, 14.8V and 22.2V.

4. The system according to claim 3 wherein the ground DC-DC converter elevates the predetermined voltage by a factor of 16 to apply a tether voltage of 177.6V for a class one tether, 236.8V for a class two tether and 355.2V for a class three tether.

5. The system according to claim 2 wherein the switch is arranged to set the voltage adjustment circuit output in accordance with the tether selection.

6. The system according to claim 2 wherein the aerial power supply has an adapter interface that operatively emulates a proprietary smart battery interface in order to report the charge state to an unmanned aerial vehicle control system such that the unmanned aerial vehicle control system operatively enables operation of the unmanned aerial vehicle.

7. The system according to claim 1 wherein the ground station is provided in an enclosure including the tether connector part, switch, ground DC-DC converter and voltage adjustment circuit and a rectifier module to deliver DC to the voltage adjustment circuit, alternating current (AC) being deliverable to the rectifier via a connector in the enclosure connectable to an external AC source.

8. The system according to claim 7 including an inverter arranged to connect to the AC connector in the ground station and having a DC connector adapted to connect to a 12V, 24V or 48V DC source.

9. The system according to claim 8 wherein the inverter is provided in an enclosure separate from the ground station.

10. The system according to claim 9 wherein the ground station has separable connectable modules comprising:

a rectifier module to transform an alternating current supply to a direct current supply for application to the tether;

an inverter module separably connectable to the rectifier module, whereby direct current from a direct current source can be converted to an alternating current compatible with the rectifier module; and, a battery module comprising a battery of charge storage devices separably connectable to the inverter module.

11. The system according to claim 1 wherein the system further comprises at least one tether separably connected to the ground station via the ground end connector, the at least one tether separably connected to the aerial power supply connector, wherein the voltage applied to the at least one tether is selected by a switch provided on the ground station.

12. The system according to claim 11 wherein the switch is manually operable.

13. The system according to claim 1 wherein the aerial power supply has a cooling system.

14. The system according to claim 13 wherein the cooling system is an air cooling system wherein a powered fan forces a flow of air around a casing of the aerial power supply.

15. The system according to claim 1 wherein a first pin is the common pin, a second pin is exclusively wired to the live conductor in a class one tether, a third pin is exclusively wired to a live conductor in a class two conductor, and a fourth pin is wired to a live conductor in a class three tether.

16. The system according to claim 1 wherein the casing of the aerial power supply is adaptable to engage with a battery dock of the unmanned aerial vehicle.

17. The system according to claim 1 wherein the aerial power supply includes a backup battery to provide power in the event of the tether supply failing.

18. The system according to claim 1 wherein the aerial power supply comprises a aerial power supply connector part of an electrical connector to connect to a corresponding tether connector part, said small unmanned aerial vehicle connector part delivering current in parallel to two or more DC-DC converter modules in order to distribute heat generation and thereby relatively reduce the operating temperature of the aerial power supply.

* * * * *